(12) United States Patent
Male et al.

(10) Patent No.: US 7,412,761 B2
(45) Date of Patent: Aug. 19, 2008

(54) METHOD OF CREATING A SLEEVE ON TUBING

(76) Inventors: Alan Leslie Male, "Lanbeth" Station Road, Ellon, Aberdeenshire (GB) AB419A2; Baird Sim Shepherd, 315 Clifton Road, Aberdeen (GB) AB244HN ( * ) Notice: Subject to any disclaimer, the term of this patent is extended or adjusted under 35 U.S.C. 154(b) by 52 days.

(21) Appl. No.: 11/367,834

(22) Filed: Mar. 3, 2006

(65) Prior Publication Data

US 2006/0196036 A1 Sep. 7, 2006

(30) Foreign Application Priority Data

Mar. 3, 2005 (GB) ................ 0504365.8

(51) Int. Cl.
*B23P 25/00* (2006.01)
*B29C 45/14* (2006.01)
*F16L 9/14* (2006.01)
*E21B 17/00* (2006.01)

(52) U.S. Cl. ............. 29/458; 29/527.1; 29/527.2; 138/153; 138/172; 264/259; 264/271.1; 285/294.1; 175/325.1; 175/325.5

(58) Field of Classification Search ............ 29/458, 29/459, 527.1, 527.2, 557, 419.1, 424, 527.3, 29/527.5; 138/153, 172; 285/294.1; 264/259, 264/260, 266, 346, 271.1; 175/325.1, 325.5

See application file for complete search history.

(56) References Cited

U.S. PATENT DOCUMENTS

| 2,716,275 A | * | 8/1955 | Matthysse | 29/459 |
| 2,897,016 A | * | 7/1959 | Baker | 175/325.6 |
| 3,942,824 A | * | 3/1976 | Sable | 285/45 |
| 4,436,118 A | * | 3/1984 | Garrett | 138/110 |
| 5,294,396 A | * | 3/1994 | Dressel et al. | 264/240 |
| 5,797,455 A | * | 8/1998 | Barron et al. | 166/241.6 |
| 5,833,018 A | * | 11/1998 | von Gynz-Rekowski | 175/325.3 |
| 6,032,748 A | * | 3/2000 | DeBray et al. | 175/325.7 |
| 6,601,281 B1 | * | 8/2003 | Chen | 29/418 |

FOREIGN PATENT DOCUMENTS

JP 62135331 A * 6/1987

* cited by examiner

*Primary Examiner*—Jermie E Cozart
(74) *Attorney, Agent, or Firm*—Law Office of Jesse D. Lambert, LLC

(57) ABSTRACT

A method and apparatus for the application of a sleeve upon a tubular, such as a pipe string, used in downhole applications, for example in oil and gas exploration or recovery. A mould is located around the tubular into which a composite material is injected. The material is cured at ambient temperature. Optional heating may then be applied to enhance the properties of the sleeve. The heating temperatures are well below those at which the structural integrity of the metal tubular would be compromised as regards its fitness for downhole use. Embodiments of wear protectors are illustrated for sleeves with and without wear pads.

4 Claims, 2 Drawing Sheets

METHOD OF CREATING A SLEEVE ON TUBING

CROSS REFERENCE TO RELATED APPLICATIONS

This patent application is a United States national application, and claims priority for all purposes to previously filed UK Patent Application No. 0504365.8, filed on Mar. 3, 2005.

BACKGROUND

1. Field of the Invention

The present invention relates to wear protectors and in particular, though not exclusively, to a method and apparatus for the application of a sleeve upon a tubular, such as a pipe string, used in downhole applications, for example in oil and gas exploration or recovery.

2. Description of Related Art

In oil and gas exploration and recovery procedures involving movement of a pipe string within a well bore contact normally occurs between the pipe string and the well bore or between the pipe string and an external casing already present in the well bore. Such contact can cause wear or perhaps even damage to the outer surface of the pipe string and the casing.

Conventionally the problem of wear upon the pipe string has been addressed by the provision of wear protection at strategic points on its outer surface, for example, at joints. Such wear protection is positioned on the outer surface of the pipe string to at least reduce contact between the outer surface of the pipe string and the wellbore, thereby reducing wear of the outer surface of the pipe string.

Conventional wear protection typically takes the form of strips of a hardwearing metal composition, such as nickel based tungsten carbide. Alternatively, the wear protection may be provided in the form of a coating of such a material over the entire outer surface of at least part of the length of the pipe string (i.e. wear banding). Pads of material may also be arranged on the surface of the pipe string. Clearly the wear protection is subject to wear when in use that would otherwise be sustained by the pipe string itself. Thus, in time the wear protection itself needs repair or replacement.

Repair or replacement of wear protection typically involves welding, and the present applicants have recognised the significance of applying heat to a pipe string during the welding process. More specifically, the structural integrity of the pipe string can be compromised by the application of heat. Thus, the pipe string is normally inspected when welding is complete to determine whether or not any structural weakness has arisen. Whatever structural weakness there is may then need to be remedied by an appropriate treatment, such as annealing. The present applicants have appreciated that such processes require specialist equipment and personnel that may only be available far from the site of use of the pipe string. Moreover, such processes are of themselves normally burdensome in cost and time.

A further type of wear protector is formed by providing the band of material as a separate sleeve located around the pipe string or tubular. These sleeves can be fixed to rotate with the tubular, often termed 'rotating' type, or may rotate relative to the tubular, termed 'non-rotating' type. Non-rotating sleeves are required to be axially retained on the tubular between raised ends or stops. This provides a disadvantage for assembly. Either the tubing must contain a threaded joint between the stops to allow the tubular to be separated to insert the sleeve, or the sleeve must be of component parts which connect together to provide an annular band. It is recognised in the industry that any joint or connection provides a potential weak point which may be prone to failure.

An object of the present invention is therefore to provide a method of applying a sleeve to a tubular which mitigates at least some of the disadvantages of the prior art.

A further object of the present invention is to provide a sub including a sleeve which is adapted for use as a wear protector.

According to a first aspect of the present invention there is provided a method of creating a sleeve on tubing for use in a well bore, the method comprising the steps:

(a) locating a mould around the tubular, the mould comprising at least first and second portions, the portions including opposite mating surfaces to engage adjacent portions such that a seal is provided between the portions and the mould including first and second ends, the ends being arranged to provide a seal against the tubular when the mould is located around the tubular with the portions providing at least one circumferential recess in the mould;

(b) inserting a composite material into the/each recess through at least one entry port in the mould;

(c) curing the composite material; and (d) removing the mould to there provide a composite sleeve around the tubular.

In this way there is no requirement to break the tubular to insert the sleeve and the sleeve is of single piece construction. Additionally the use of a composite material, which is cured, removes the need to heat the tubular to temperatures which could affect the integrity of the tubular. Indeed, the simplicity of the system makes it readily available for use at the well head. The sleeve provides a wear protector upon the tubular.

Preferably, the method includes the step of keying at least a portion of the surface of the tubular prior to step (a). Keying the tubular may be done by sand blasting or another roughing method which provides better adhesion of the composite material to the tubular.

Optionally, the method includes the step of coating at least a portion of the tubular with a stand-off material prior to step (a). Preferably, the method includes the step of removing the stand-off material once the composite material has cured. By using a stand-off material such as wax, adhesion of the composite material is prevented and a clearance is created between the tubular and the sleeve so that the sleeve may rotate relative to the tubular.

Preferably, the method includes the steps of keying circumferential bands on either side of a central band longitudinally arranged on the tubular. This provides a central non-rotating sleeve bounded by end stops in-situ.

Advantageously, the method includes the step of inserting the composite material into at least one further recess arranged on the circumferential recess of the mould, the at least one further recess being arranged as a pad. This allows pads to be incorporated during manufacture of the sleeve. Such wear pads provide wear protection while also allowing fluid to easily bypass the sleeve in the well bore. Alternatively a wear pad may be made in the further recess and then applied to the sleeve as the sleeve is moulded. The pad may be made of a composite material. Here the composite sleeve will attach the pad to the tubular.

It should be noted that these wear pads are not blades or fins as would be found on centralisers. Any centralising ability of the pads would be quickly lost due to the uneven wear to which the pads are exposed to. The material of the pads is also selected to be sacrificial to advantageously reduce friction between the string and casing, this is not the case for blades on centralisers. The use of pads and the shape selected for them is chosen to allow optimum fluid flow past the wear protector sleeve in use.

Preferably the step of curing the composite material is achieved by leaving the mould upon the tubular for a period of time at ambient temperature. Thus the method can be carried out at any location, i.e. at the well head or platform. Additional heating may be applied to the composite material prior to insertion in the mould. In this way the viscosity of the material can be decreased to aid insertion to the mould. This pre-heating temperature may be up to approximately 50 degrees C.

Following curing, heat may optionally be applied to the sleeve to enhance advantageous properties of the composite material. Such properties may include increased wear resistance, heat resistance etc. This heating effectively gives the material a 'memory' quality. Such heating may be to temperatures up to approximately 150 degrees C. These temperatures are still below approximately 600-800 degrees C., these being the minimum temperature where the structural integrity of the metal tubular may need to be considered.

Preferably also, the method may include the step of inserting a matrix material in at least one recess. The matrix may be a webbing of high strength material to which the composite adheres. This will improve the tensile strength of the sleeve. Alternatively, the method may include the step of wrapping a bandage of material around the tubular prior to locating the mould on the tubular over the bandage. The bandage may be a webbing soaked in a composite or glass fibre mix and applied before it sets or cures. Again this will improve the strength of the sleeve.

Preferably, the composite material comprises at least two composite components, which when mixed are in a mouldable condition and which subsequently change to a rigid condition. More specifically, one of the composite components may comprise a catalyst. Additionally, the composite material may be a sacrificial material. In this way, the sacrificial material will wear away upon contact to and in preference to the surface of the well bore or casing bore.

According to a second aspect of the present invention there is provided a sub for location in a tubular string within a well bore, the sub comprising a tubular body having first and second ends adapted for connection in a tubular string; a continuous single piece sleeve located around the tubular body, the sleeve arranged to move axially and rotationally upon the tubular body; first and second end stops, the stops comprising continuous single piece annular bands located around the body at either side of the sleeve, the stops being fixed upon the body such that they limit the axial movement of the sleeve and wherein the sleeve and stops all comprise a composite material.

Preferably the sub is a wear protector.

Preferably the sub is formed by a method according to the first aspect. In this way the composite material may be identical for the sleeve and the stops. The sleeve may further comprise a matrix in the form of a web imbedded within the composite material. Alternatively, or additionally, the sleeve may further comprise a bandage arranged circumferentially within the composite material.

Advantageously there may be arranged on the sleeve one or more wear pads, the pads comprising the composite material.

Preferably the sleeve has an outer diameter greater than an outer diameter of the stops.

According to a third aspect of the present invention there is provided a mould for use in providing a sleeve by a method according to the first aspect, the mould comprising at least first and second portions, the portions including opposite mating surfaces to engage adjacent portions such that a seal is provided between the portions and the mould including first and second ends, the ends being arranged to each provide a circumferential seal against a tubular when the mould is located around a tubular with the portions providing at least one circumferential recess in the mould. The mould can thus be located around the tubular and a material injected into the mould, left to set and the mould removed.

Preferably, there are arranged two circumferential indents spaced apart longitudinally on the mould, each indent traversing the portions and having a depth approximately equal to a depth of the recess at the location of the indent. In this way, a sleeve with integral stops can be provided.

BRIEF DESCRIPTION OF THE DRAWINGS

Specific embodiments of the present invention will now be described with reference to the accompanying drawings, in which.

DETAILED DESCRIPTION OF THE PREFERRED EMBODIMENT(S)

Figure 1:
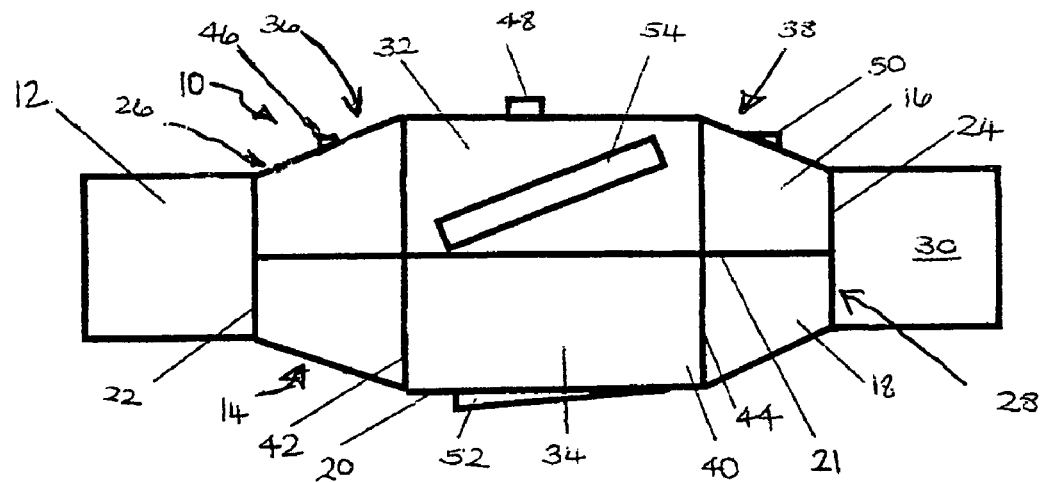
FIG. 1 is side view of a tubular upon which is located a mould according to an embodiment of the present invention.

Reference is initially made to FIG. 1 of the drawings which illustrates a sleeve, generally indicated by reference numeral 10, being formed on a tubular 12 by application of a mould 14 according to an embodiment of the present invention.

Tubular 12 is a hollow cylindrical body typically formed as a pipe. Tubular 12 is formed of a metal appropriate for use in downhole oil and gas applications. Tool 12 may form part of a sub, joint or string. The tubular 12 is generally hollow to allow the passage of fluids therethrough.

Mould 14 comprises first 16 and second 18 portions, being semi-circular segments, which when held together form an annular body 20 which can surround the tubular 12. At the point of joining of the portions 16, 18 there is a seal 21 which prevents the release of fluids from the portions transversely from the mould 14. Body 20 also provides seals 22, 24 at first 26 and second 28 ends of the mould 14. End seals 22, 24 provide a seal between the body 20 and the outer surface 30 of the tubular 12. In this way fluids are prevented from escaping from an inner volume 32 of the mould 14 when it is located upon the tubular 12. It will be recognised that the mould 14 and, in particular, the circumference of the seals 22, 24 are sized to match the outer diameter of the tubular 12.

Mould 14 is shaped to provide three sections, an inner section 34 flanked by two outer sections 36, 38. Inner section 34 has a uniform diameter in which is located a circumferential recess 40 which describes an annular sleeve 10 around the tubular 12. The outer sections 36, 38 have an identical diameter at one end and then tail off linearly to the respective ends 26, 28. In the embodiment shown the mould 14 further includes partitions 42, 44 which isolate each section from the others. The partitions are arranged over the volume 32 to meet the outer surface 30 of the tubular 12.

Located at each section 34, 36, 38 are inlet ports 46, 48, 50. These ports provide a means for fluids or other materials to be injected through the mould 14 into the inner volume 32. Three ports are provided so that, if required, different fluids may be injected into each section 34, 36, 38. It will be appreciated that exhaust ports may be incorporated in tandem with the inlet ports so that air can be evacuated from the volume 32 as a fluid is injected through the ports 46, 48, 50. In this way an air tight mixture can be enclosed in the inner volume 32.

In an embodiment of the present invention the mould 14 also includes additional recesses 52. These recesses are located on the circumferential recess 40 and describe pads 54 which project from the mould 14 when located on the tubular 12. Any design of pad 54 may be incorporated, though typically a rectangular arrangement is used to provide a large surface area to contact the casing or well bore wall.

In use, a tubular 12 is selected and its surface 30 cleaned to be free of grease and other detritus. Lengths equal to the longitudinal distances of each section 34, 36, 38 are marked upon the surface 30. The outer sections are then shot blasted or otherwise treated to provide a 'keyed' surface suitable for adherence of the material of the outer sections 36, 38 of the sleeve 10. The outer surface at the central section 34 is coated with a wax-based substance or other lubricant which will prevent adherence of the material of the sleeve 10 at this location.

Mould 14 is then placed over the tubular, with the portions 16, 18 meeting to provide longitudinal seals 21. At the same time the ends 26, 28 meet the outer surface 30 of the tubular 12 to completely seal the inner volume 32 against the surface 30. The partitions 42, 44 will also engage the surface 30 at the positions between the keyed sections and the waxed section. The mould 14 may be held in this position by clamps, bolts or other known retaining means between the portions 16, 18.

A composite material suitable for injection is then mixed or otherwise prepared. Typically the composite comprises two components, namely a resin and a catalyst. However, it will be appreciated that incorporation of a third material in the form of a fibrous material such as aramid fibres, e.g. carbon fibre or Kevlar®, can be used to strengthen the composite material. The material is in a mouldable condition and is injected or pumped into the mould 14 through the inlet ports 46, 48, 50. In an embodiment, the material is heated to a temperature up to 50 degrees C. just prior to injection. In this way, the viscosity of the material is improved for injection purposes so that the material is injected through the ports 46, 48, 50 easily. As the partitions 42, 44 keep the sections 34, 36, 38 separate, differing composite materials may be injected into each of the sections 34, 36, 38. The process is continued until the entire inner volume 32 is filled with composite material.

For the embodiment where the mould 14 includes pads 54, the user has the choice of whether to inject additional material to fill these recesses 52 in addition to the recess 40 or to pre-fill the recesses 52 prior to locating the mould 14 upon the tubular 12. Such pre-filling allows a user to select any material for the pads. The pre-fill material is not required to be mouldable or injectable, but is merely required to adhere to the composite material used to fill the sections in the sleeve 10.

Following injection of the composite material(s), the mould 14 is held in place to allow the composite material to cure. Subsequently, the composite material cures to thereby change from a mouldable condition to a rigid condition. This curing process is typically achieved by leaving the mould 14 in place at ambient temperature for a period of time, e.g. 1-6 hours.

Once the composite material is cured, the mould 14 can be removed. Heat can then be applied to the mould to enhance characteristics such as wear resistance and heat resistance. Such raising of the temperature, for example, to a value up to approximately 150 degrees C. improves the memory properties of the composite material. The additional heating may be achieved by placing a heating element in or around the mould 14. This additional heating is also used to remove the wax-based substance between the central section 34 of the sleeve 10 and the outer surface 30 of the tubular 12. In this way a clearance 56 is created circumferentially around the tubular 12 and between the central section 34 of the sleeve 10 and the outer surface 30. Release of the central section 34 from the neighbouring sections 36, 38 is achieved by gently tapping the section 34 upon removal of the mould 14.

Those skilled in the art will recognise that a sleeve is thus formed of the non-rotating type. Advantageously the end stops 60, 62 (sections 36, 38) are formed at the same time that the sleeve 58 (section 34) is formed. End stops 60, 62 are fixed to the tubular 12 while the sleeve 58 is free to rotate relative to the tubular 12 and move axially between the end stops.

Figure 2:
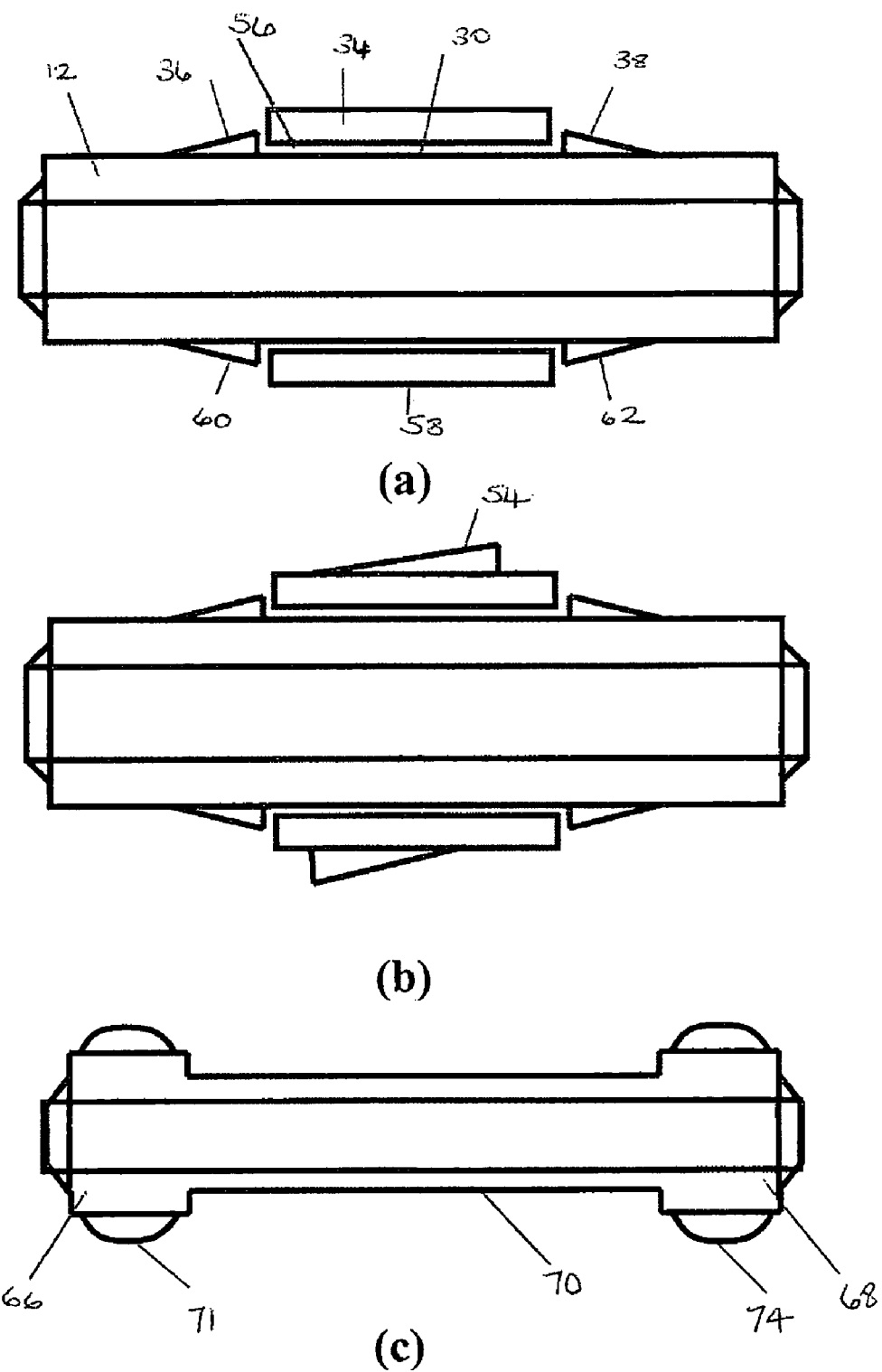
FIGS. 2(a)-(c) are cross-sectional views of subs in the form of wear protectors, according to embodiments of the present invention.

Such embodiments of a wear protector are illustrated in FIGS. 2(a) and 2(b). Like parts to those of FIG. 1 have been given the same reference numeral to aid clarity. FIG. 2(a) shows a simple protector arrangement where the central section 36 forms a sleeve 58. The outer diameter of the sleeve 58 is greater than the outer diameter of the end stops 60, 62. This ensures that the sleeve 58 preferentially makes contact with the casing or well bore wall. The sleeve 58 material may thus be selected to be self-sacrificial. FIG. 2(b) shows a cross-sectional view of a wear protector as described hereinbefore including pads 54.

Reference is now made to FIG. 2(c) of the drawings which illustrates a section of a pipe string which may be referred to as a sub. Those skilled in the art will recognise that illustration is not to scale as the end joints 66, 68 are enlarged and the length of the tubing 70 is much shorter than would be typically use in a downhole environment. The figure is thus used to illustrate the application of wear bands or protectors 71, 74 on each of the joints 66, 68. Each wear protector 71, 74 is formed by the method described hereinbefore using a mould containing a single section provided with one circumferential recess. With the wear bands 71, 74 in place the sub, which may form part of a tool, is locatable in a downhole application of at least standard profile, as defined in accordance with American Petroleum Institute standards.

An alternative method may be used to form the bands 71, 74. In this method the outer surface of the tool joint 66, 68 is prepared as per the first method by removing grease and by shot blasting. Two rubber bands (not shown) are applied to the tool joint such that they are spaced apart to define a surface area between them over which the wear band is to be formed. A first coating of composite material is applied over the surface of the tool joint between the rubber bands. This may be applied by the application of a mould as described hereinbefore. Then a glass fibre bandage is wrapped over the first composite coating and a second coating of composite material is applied over the bandage. The bandage may be any form of webbing matrix which advantageously holds a material while improving support thereof. More specifically, the bandage may comprise a fibrous material which includes at least one of an aramid fibre and a polyester fibre. For example, the fibrous material may be in the form of one or more of fibres, a tape and a sheet. The fibrous material may be in at least one of a woven and a non-woven form.

The steps of applying the bandage and a coating of composite are repeated until the desired thickness of wear band is achieved. A final coating of composite is applied using a mould as described hereinbefore to encapsulate the formed wear band until the composite material is cured. The wear band 71, 74 is allowed to cure at ambient temperature before being heated to enhance its properties.

This method may be adapted by use of appropriate moulds to form the pads 54 of the embodiment described with reference to FIG. 1.

In use, the wear bands 71, 74—whether formed by the first or second method—provide wear protection for the sub. In addition, the wear bands act in a sacrificial manner by virtue of the characteristics of the cured composite material.

Figure 3:
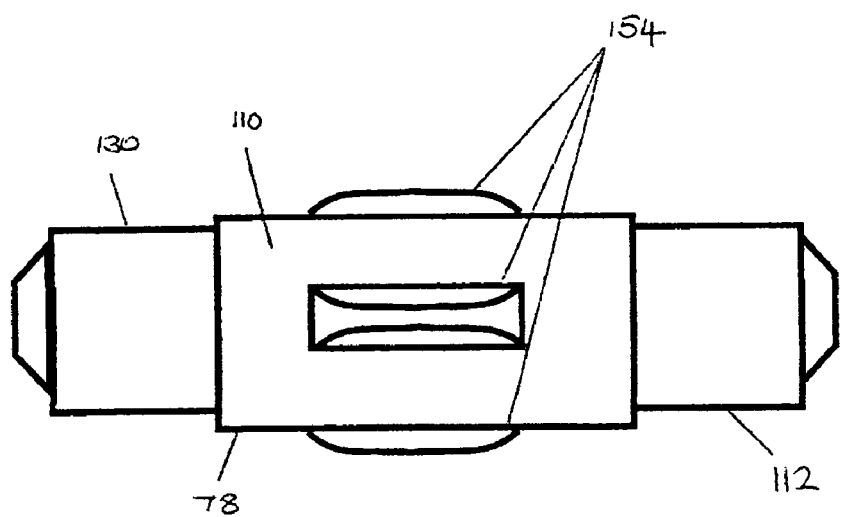
FIG. 3 is a side view of a sleeve on a sub according to a further embodiment of the present invention.

A further embodiment for the present invention is illustrated in FIG. 3. Like parts to those of the earlier Figures have been given the same reference numeral with the addition of 100 to aid clarity. This figure shows a pipe 112. The pipe 112 is formed of a metal appropriate for use in downhole oil and gas applications. More specifically, the pipe is intended to be located in a bore formed in another pipe or in a wellbore. As may be appreciated from the Figure, four wear protection pads 154 are attached to the outer surface 130 of the pipe 112 via a composite sleeve 110. With the pads 154 in place the pipe 112 is locatable in a downhole application of at least standard profile, as defined in accordance with American Petroleum Institute standards.

Each pad 154 is of a composite material for providing hardwearing protection for the pipe 112 when in use. Each pad is bonded to the outer surface of the pipe by means of a sleeve 110 of composite material, as described hereinbefore. The pads 154 are provided on the pipe 112 by the following method.

The pads 154 are formed by moulding or by machining. The composite material comprises three components, namely a resin, a catalyst and aramid fibres, which when mixed are in a mouldable condition, in which the pad can be shaped. Subsequently, the composite material cures to thereby change from a mouldable condition to a rigid condition, in which machining to form the pad can be accomplished if need be. The aramid fibres enhance the strength of the pad. A raised section of the pad makes it easier for the wear protector to be inserted into the well bore.

The outer surface 130 of the pipe is prepared as described hereinbefore. Pads 154 are located in the mould and the mould is applied to the pipe 112. The sleeve 110 is applied using the method described hereinbefore permanently attaching the pads 154 to the sleeve 110, when the composite material cures. In this way pads with enhanced properties suitable for wear protection can be applied to sleeves formed in accordance with the present invention.

The principal advantage of the present invention is that it provides a method of forming a one-piece sleeve on a tubular in which there is no need to expose the metal pipe to high temperatures at which the structural integrity of the metal pipe is compromised as regards its fitness for downhole use.

This is in contrast e.g. as might be caused by welding processes. Such high temperatures are typically of the order of 600° C. to 800° C. Welding at such temperatures can cause structural changes, in particular in heat affected areas of the metal pipe. As a result stresses can build up between the heat affected areas and the unaffected areas, which in turn can compromise the structural integrity of the pipe. According to the invention, the temperature of the pipe may, however, be elevated above ambient temperature following curing to enhance the properties of the composite material. Nevertheless, such a temperature elevation does not raise the temperature of the pipe to the extent that its structural integrity is compromised.

A further advantage of the present invention is therefore that it provides a method of applying wear bands, wear sleeves and/or pads to tubing which can be used at the well head. In this way worn sections are easily replaceable without the need to return the tubing or sub to a work shop for repair/replacement.

It will be appreciated by those skilled in the art that modifications may be made to the invention hereindescribed without departing from the scope thereof. For example, other structures from pads may be incorporated. Separate moulds may also be used instead of using partitions in a single mould. Additionally the sleeve may be formed in an annular recess already formed on the tubular.

Therefore, the scope of the invention is not to be measured by the exemplary embodiments described herein, but by the scope of the appended claims and their legal equivalents.

We claim:

1. A method of creating a sleeve on a tubular for use in a well bore, the method comprising the steps of:
   (a) locating a mould around the tubular, the mould comprising at least first and second adjacent portions, said first and second adjacent portions including opposite mating surfaces connecting said first and second adjacent portions such that a seal is provided between the portions, and the mould including first and second ends, the ends being arranged to provide a seal against the tubular when the mould is located around the tubular with the portions providing at least one circumferential recess in the mould;
   (b) inserting a composite material into said at least one circumferential recess through at least one entry port in the mould;
   (c) inserting the composite material into at least one further recess arranged on said at least one circumferential recess of the mould, the said at least one further circumferential recess being arranged as a pad;
   (d) curing the composite material; and
   (e) removing the mould to there provide a composite sleeve around the tubular.

2. A method of creating a sleeve on a tubular for use in a well bore, the method comprising the steps of:
   (a) providing a mould having a circumferential recess, and inserting at least one pad into at least one recess arranged on said circumferential recess of the mould, locating said mould around the tubular, the mould comprising at least first and second portions, said first and second portions including opposite mating surfaces connecting said first and second portions such that a seal is provided between said first and second portions, and the mould including first and second ends, the ends being arranged to provide a seal against the tubular when the mould is located around the tubular with the portions providing at least one circumferential recess in the mould;
   (b) inserting a composite material into said at least one circumferential recess through at least one entry port in the mould;
   (c) curing the composite material; and
   (d) removing the mould to there provide a composite sleeve around the tubular.

3. A method of creating a sleeve on a tubular for use in a well bore, the method comprising the steps of:
   (a) locating a mould around the tubular, the mould comprising at least first and second portions, said first and second portions including opposite mating surfaces connecting said first and second portions such that a seal is provided between the portions, and the mould including first and second ends, the ends being arranged to provide a seal against the tubular when the mould is located around the tubular with the portions providing at least one circumferential recess in the mould;
   (b) inserting a composite material into said at least one circumferential recess through at least one entry port in the mould;
   (c) curing the composite material;
   (d) removing the mould to there provide a composite sleeve around the tubular; and
   (e) heating the sleeve following curing.

4. A method as claimed in claim 3 wherein the step of heating comprises elevating the temperature in a range between ambient and approximately 150 degrees.

* * * * *